United States Patent [19]

Tavakoli et al.

[11] Patent Number: 4,974,337
[45] Date of Patent: Dec. 4, 1990

[54] APPARATUS AND METHOD OF DRYING AND DEHUMIDIFYING PLASTIC

[75] Inventors: Kaihan Tavakoli, Meadville; Harold E. Weckerly, Seneca, both of Pa.

[73] Assignee: The Conair Group, Inc., Pittsburgh, Pa.

[21] Appl. No.: 428,767

[22] Filed: Oct. 30, 1989

[51] Int. Cl.⁵ ............................................. F26B 19/00
[52] U.S. Cl. ........................................... 34/27; 34/44; 34/62; 34/72; 34/80
[58] Field of Search ................ 34/32, 80, 13, 20, 22, 34/27, 72, 62, 44

[56] References Cited

U.S. PATENT DOCUMENTS

| | | | |
|---|---|---|---|
| 3,163,888 | 1/1965 | Shattuck | 18/30 |
| 3,194,868 | 7/1965 | Shaw | 264/328 |
| 3,259,175 | 7/1966 | Kraus et al. | 165/12 |
| 3,766,660 | 10/1973 | Settlemyer | 34/80 X |
| 3,950,118 | 4/1976 | Adair | 425/144 |
| 4,508,670 | 4/1985 | Janke | 264/40.6 |
| 4,541,792 | 9/1985 | Zakic | 425/143 |
| 4,621,678 | 11/1986 | Hahn et al. | 165/27 |
| 4,870,760 | 10/1989 | Graff | 34/80 X |

OTHER PUBLICATIONS

Conair/Franklin Brochure entitled "Dehumidifying Dryers and Preheaters" (Form FDB-3 SEN 5/88).

*Primary Examiner*—Henry A. Bennet
*Attorney, Agent, or Firm*—Buchanan Ingersoll

[57] ABSTRACT

An apparatus and process for heating and dehumidifying plastic materials in a container, such as a hopper, using a current of warm dry air. The apparatus having a desiccant for removing the moisture picked up from the material, and having a heater and cooler downstream from the desiccant. The dryer control operates in three modes to control the cooler only, to control the heater and cooler, and to control the heater only. Measured temperatures and operating conditions control the selection of specific modes.

31 Claims, 4 Drawing Sheets

APPARATUS AND METHOD OF DRYING AND DEHUMIDIFYING PLASTIC

BACKGROUND OF THE INVENTION

1. Field of the Invention

This invention relates to a method of heat treating beads or pellets of thermoplastic substance prior to processing the resulting material. It is more particularly concerned with such a method which does not require electrical heating of the pellets, in which the process is operated in one of three operating modes, depending upon the desired drying requirements and the actual operating conditions.

2. Description of the Prior Art

Electrically heated dehumidifying dryers are generally used in the plastics industry. The reason for using electrical units is their ability to be readily controlled at a setpoint over a wide temperature range. The electrical heating elements can be controlled so as to be operated anywhere between 0 and 100% of load. The heating range for the plastic pellets or beads generally used is about 130° F. to 400° F. and control is readily achieved by simply controlling the current in the heating element. The cost of heating the plastic material by electrical means is considerably greater than the cost of generating an equivalent amount of heat by combustion of natural gas, oil, or other combustible fuel. Prior combustion heating devices, however, cannot be as simply controlled over a wide range. The heating of the pellets is generally accomplished by passing heated air from a heat exchanger through them. The blower required to move the air through the pellets necessarily introduces some heat. A desiccant, such as a molecular sieve, is frequently used to facilitate moisture removal from the air current and its heat of absorption is passed on to the air in the system.

SUMMARY OF THE INVENTION

In an embodiment of my invention, a current of air is passed through a chamber or hopper holding plastic pellets. The air is propelled by a blower and passes through a desiccant chamber, a heat exchanger heated by means such as a fuel combustion means, and a cooling or refrigerating means. The temperature of the air is measured entering the hopper and the control selects one of three modes of drying set out in more detail hereinafter, each mode corresponding to a separate portion of the temperature range or operating condition between about 130° F. and about 400° F. In the first mode, the desired temperature of drying is generally lower than the measured temperature of the air of the residual heat. The air temperature is controlled by the residual heating and the amount of cooling from the cooling means. In the second mode, if the desired temperature of drying is only moderately higher than the measured temperature of the air, the air is heated by combustion of oil or gas, and cooled by control of the cooling means to achieve the desired final temperature. In the third mode, if the desired temperature is generally in the upper portion of the temperature range, the air is heated by the control of the combustion heat exchanger without recourse to the cooling means.

DESCRIPTION

Figure 1:
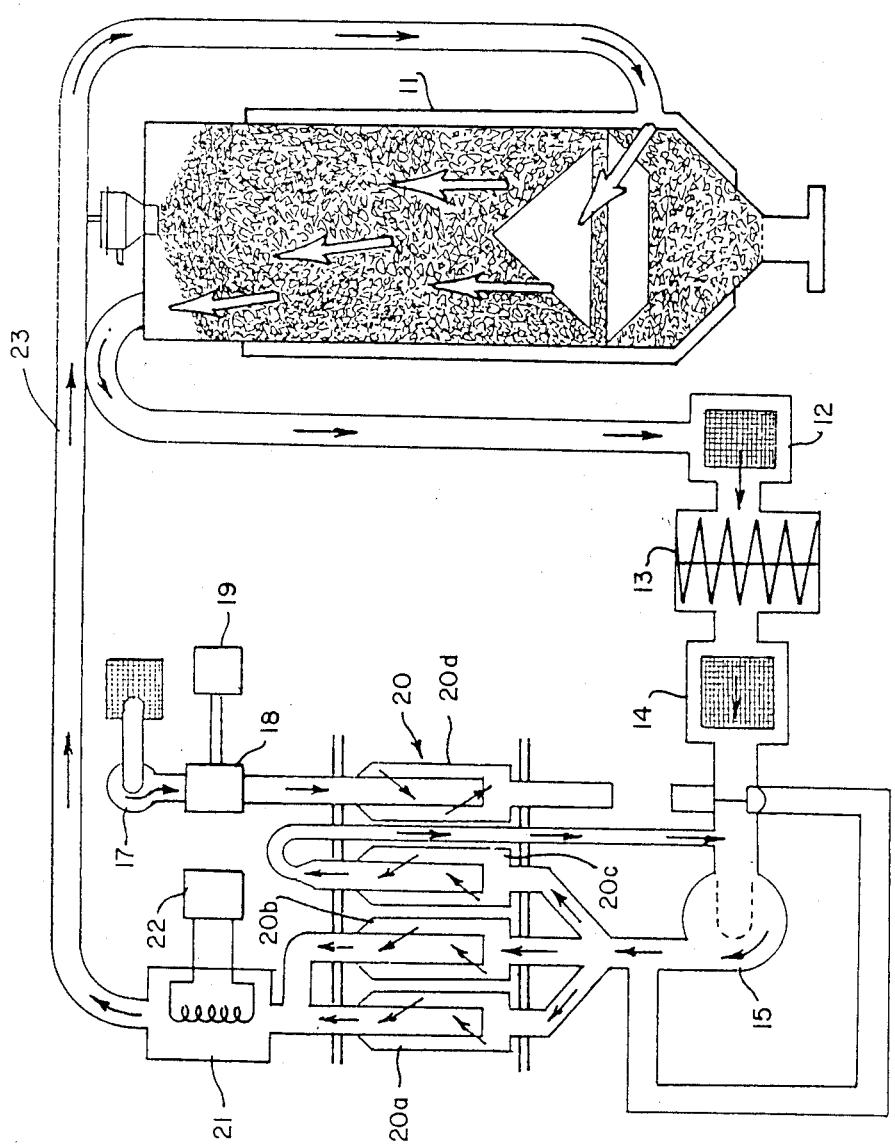
FIG. 1 is a diagrammatic representation of prior art.

A typical prior art plastics dryer is shown in FIG. 1 in which a hopper 11 is generally fed with materials such as granular plastics. An airflow which is established through the material exits at the top, and after passing through a filter 12, a cooling unit 13, and a second filter 14 is caused to circulate by main blower 15. Filters 12, and cooler 13 may be omitted on some units, their purpose being to remove particulate from the return stream, and cooler 13 is used to reduce the temperature of the return air to a level so as not to harm the blower and other downstream elements in the system by extreme high temperature return air. Moisture entrained in the airstream passing through main blower 15 is removed by a desiccant 20. The rotary desiccant 20 has four cartridges 20a through 20d as shown. During the operation of the equipment, the desiccant is regenerated or recycled for use by air supplied from the regeneration blower 17 passing through the electrical heating element 18 and then through cartridge 20d. Electrical heating element in the regeneration unit 18 is controlled by the regeneration control 19. The processed air, after being dried in the desiccant unit 20a–c, passes into a process heater 21 which is an electric heating unit controlled by the process heater control 22. Such control would include temperature feedbacks which finally control the electrical current supplied to the heater to produce the desired process temperatures. The high cost of electrical power can be a disadvantage of the system shown in FIG. 1.

Figure 2:
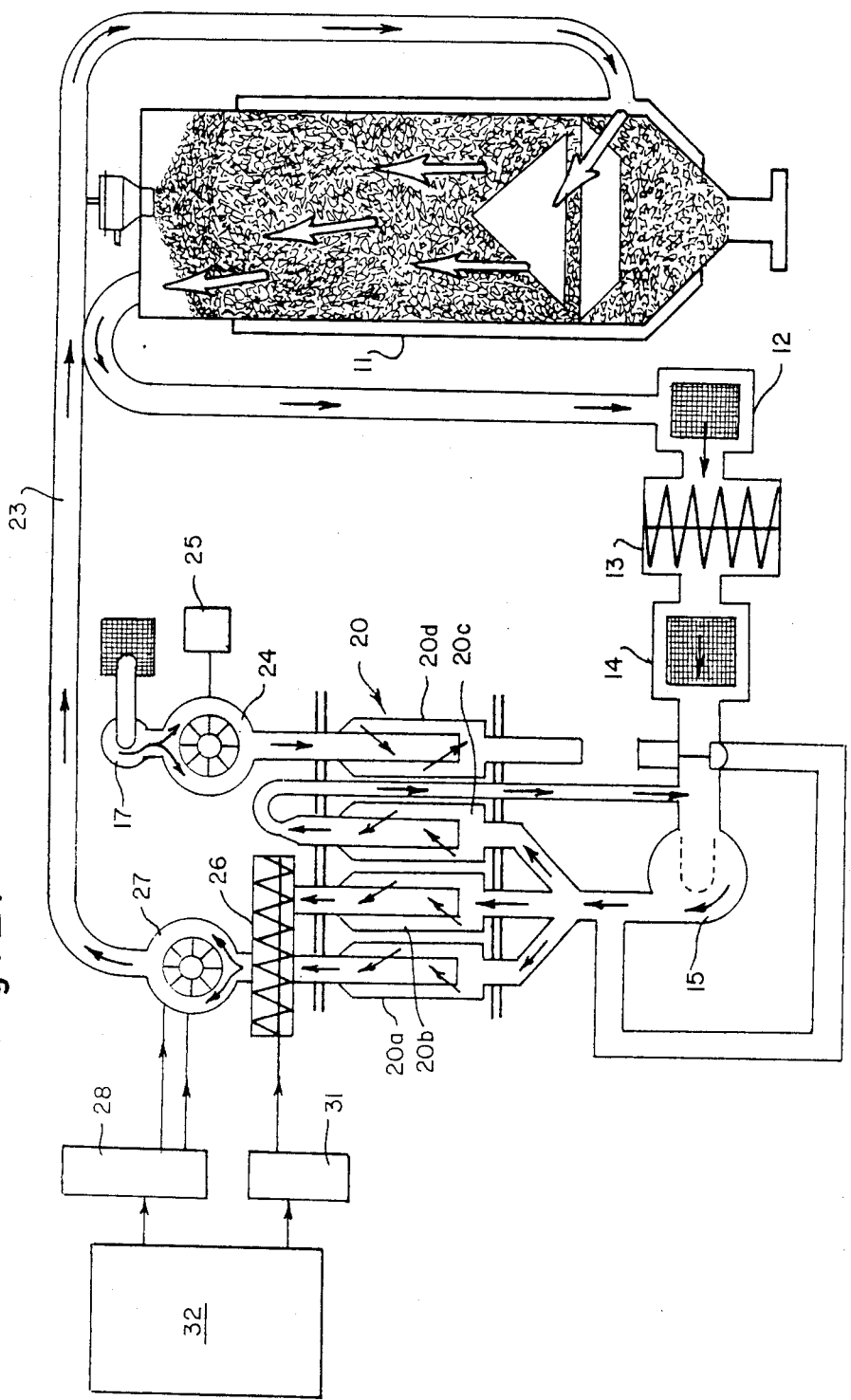
FIG. 2 is a diagrammatic representation of one embodiment of the process and apparatus of the present invention.

In the gas-fired dryer of the present invention shown in FIG. 2, similar components have been given the same reference numbers as FIG. 1. In the process control shown in FIG. 2, return air from the hopper 11 can again be optionally drawn through filters 12, 14, and cooler 13. Blower 15 provides the primary means for pumping the air through the system. Desiccant 20 and its cartridges 20a through 20d work similarly and can be rotatably indexed between regeneration modes and drying modes. Regeneration blower 17 forces regeneration air through the gas-fired regeneration heater 24 which is controlled by its heater control 25. After the process air has had moisture removed via cartridges 20a, 20b and 20c, the process air is directed into the air cooling or refrigeration means 26. This can be an electrically operated refrigeration unit or a water-cooled heat exchanger in which the inlet flow of water to the heat exchanger is controlled by the process cooling control 31. Presently, preferred embodiments of the cooler use process water available at a plant ambient temperature. In such preferred embodiments, the control 31 can include electrically operated solenoid valves. Such valves may be cycled to achieve the desired cooling or refrigeration. The dryer control 32 provides input to the cooling control 31 to supervise the amount of temperature change made to the process air by the cooling means 26. Downstream from the cooling means 26 is a combustion-fired heat exchanger 27. In the presently preferred embodiments, the heat exchanger 27 can be a single burner operated to provide two levels of output, a low heat output or "low fire" and a high output or "high fire" in which the full heating capacity of the burner is used. Burner control 28 controls the burner 27. In the presently preferred embodiments, the "low fire" operation is maintained in a second mode and remains at a fixed low temperture heating level. A "high fire" or high output capacity of the burner is modulated in an on/off sequence during a third mode of operation. The dryer control 32 provides intelligence to the burner control 28 to assure that the process drying air in duct 23 as sensed by the control 32 is the desired level or setpoint temperature which the equipment operator programs into the dryer control 32.

Figure 3:
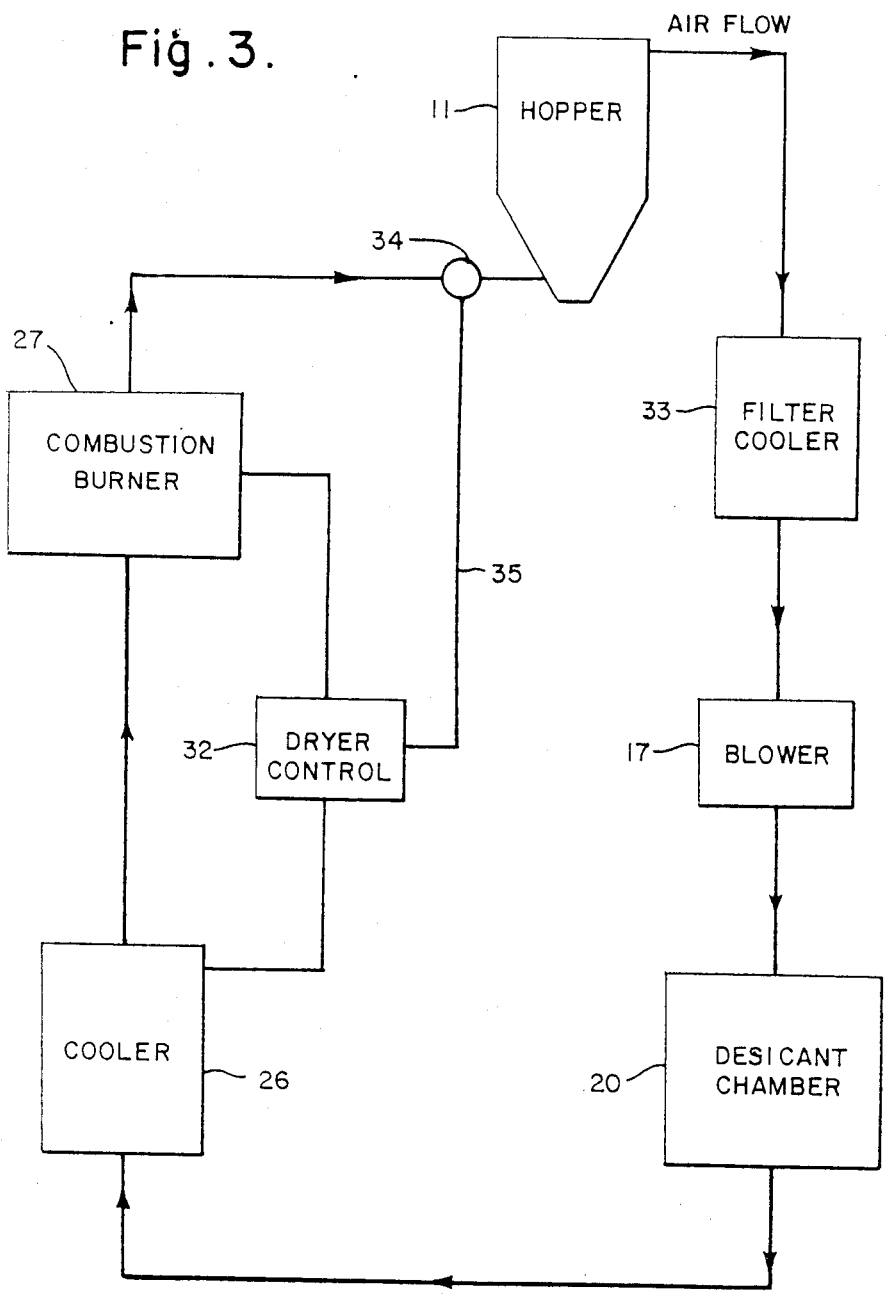
FIG. 3 is a simplified block diagram of the air flow in an embodiment of the invention.

FIG. 3 shows a simplified block diagram of the airflow through the present invention. Similar pieces of equipment are given the same reference numbers which they had in prior figures. Return air from the hopper 11 flows through the optional filter cooler arrangement 33 similar to that shown in FIG. 2, reference numerals 12, 13 and 14. Blower 17 then forces the air through the desiccant chamber 20 and into the cooler 26. An adjustable combustion-fired heat exchanger 27 heats the air to the desired temperature and the outlet process air is then returned to the hopper 11. The dryer control 32 receives a temperature feedback signal from the temperature sensor or probe 34 which is located downstream of the cooler 26 and combustion burner 27. As shown in FIG. 3, the sensor probe 34 is located adjacent to the air inlet of the hopper 11, but other locations can satisfactorily provide the feedback signal to the dryer control 32. In some applications it may be more desirable to locate a temperature sensor such as 34 adjacent the output of the combined cooler and combustion heater, thereby positioning the sensor in the same control environment as the other dryer equipment. While it has been shown that the cooler is generally upstream of the combustion heater 27, it is to be understood that other arrangements are within the scope of the present invention, such as reversing the relative position of the combustion heater and the cooler in the airflow. It is important to note that the cooler 26 and the heater 27 work in conjunction over a wide temperature range to provide the desired output temperature, each of the elements providing sufficient cooling or heating to arrive at the final desired output temperature.

The dryer control 32 operates the system in three basic control modes. The mode of control selected by the dryer control 32 depends upon the relationship of the measured temperature from sensor 34 of the air being introduced into the hopper 11 to the setpoint or desired drying temperature which has been set or programmed into the control 32. Control 32 of presently preferred embodiments includes a microprocessor. Other operating variables can also control which of the three modes the dryer control 32 will implement.

If the desired temperature which is set into the dryer control 32 is below the measured temperature at the temperature sensor 34, the control 32 can select the first mode. In the first mode, the combustion burner or heat exchanger 27 is inactive or bypassed. Heat is not added through the combustion heat exchanger 27 to the process air during continuous operation in mode 1. Mode 1 uses the cooling means 26 as a control of the outlet air temperature of the dryer unit. Feedback 35 from the sensor 34 provides the information on the measured temperature to the dryer control 32 which causes an increase or decrease in the cooling provided to the process air by the cooling unit 26. In all operating modes, a certain residual heat occurs in the system The residual temperature can be thought of having four components, heat generated by the compression and operation of the blower 15, the heat of absorption in the molecular sieve or desiccant 20, the return air temperature coming into the dryer from the hopper, and the heat of regeneration of the desiccant 20. As a result, the process air before coming to the cooler 26 may be at a temperature higher than that necessary to reach the setpoint process air temperature at sensor 34. In mode 1, the level of cooling and heat removal from the process air is controlled by the cooling unit 26. The dryer control 32 can vary or cycle the cooling of the unit 26 until a steady state actual measured temperature is achieved at the sensor 34. The level of cooling is adjusted to reach the desired output and thereby compensates for changes in the residual temperature of the returning process air and other operating conditions.

In mode 2, the control 32 operates to institute a burner on condition providing a "low fire" heating in the combustion heat exchanger 27. While heat is added to the system air via the combustion heat exchanger 27, heat can be removed via utilization of the cooling means 26 to achieve the desired temperature at the probe 34. The cooling means can be controlled either by cycling or through continuous variation of the cooling media, or by other known cooling techniques. The residual heat in the return process air can be reduced by the controlled cooling of the cooling means 26 and additional heat can be added by the combustion heat exchanger 27 which is set on a low heat condition. Mode 2 provides for intermediate heat requirements within the drying system. Mode 1 was used where the drying requirements within the hopper were less.

Mode 3 is used when higher heat levels are desired and mode 2 can generally no longer provide sufficient heating of the process air to cause the temperature probe 34 to easily reach the desired drying temperature. In mode 3, the cooling or refrigeration means 26 is turned off and the combustion burner is now the controlled device providing additional heat to the residual heat that is in the system. A two-stage burner having a high fire and a low fire control has been found to be particularly advantageous in one presently preferred embodiment of the present invention. In the two-stage burner, a single burner is used and both the air and the fuel mixtures are controlled to provide either a low fire or a high fire condition. The valving maintains the low fire at all times during mode 3 and the dryer control 32 can then cycle on times for the high fire condition so as to increase the overall heating in the combustion heater 27. As the dryer control 32 responds to changes in operating conditions, it will automatically shift between the various three modes to that mode which best operates the system to achieve the desired process air temperature. When the control is in mode 2 and additional heat is required such that the actual temperature at the probe 34 is greater than a predetermined temperature difference, the control can shift to a mode 3 operation. In the presently preferred embodiment, this temperature difference has been found to be about 3° F. Similarly, when operating in a mode 3 condition, the control will shift to a mode 2 if the difference between the actual temperature and the desired temperature is greater than a predetermined temperature value, such as 3° F. Similarly, the control can shift between modes 1 and 2 when the system is no longer using the cooling cycle of the cooling means 26. If the percentage of cooling supplied by the cooler or refrigerator 26 is zero or very low, then the dryer control 32 can shift to mode 2 operation in which the burner is on a "low fire" output.

Figure 4:
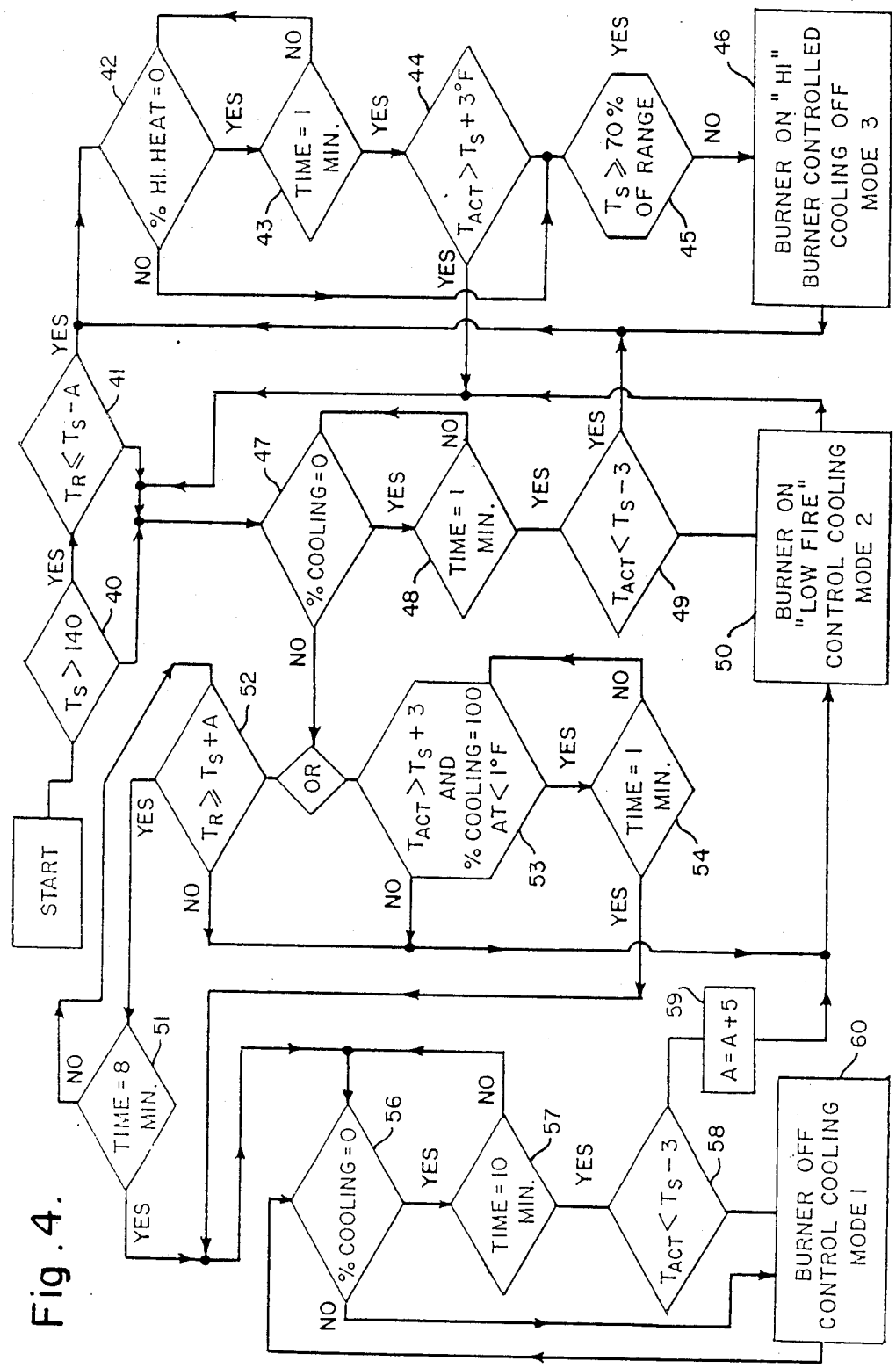
FIG. 4 is a flow chart of the control of an embodiment of the present invention.

FIG. 4 shows a flowchart for the control of a preferred embodiment of the invention. In the flowchart, the symbol $T_R$ stands for the residual temperature as measured at the inlet of the cooling heat exchanger or downstream of the desiccant. $T_{ACT}$ is the actual temperature as measured at the inlet of the hopper temperature sensor probe 34. It is to be understood that the sensor 34 could also be located at the outlet of the combustion heat exchanger 27 in FIG. 3 or at any other appropriate position in the flow, such as downstream of both 27 and 26. $T_S$ is the temperature setpoint or the desired temperature as programmed into the control 32. In the presently preferred embodiment of the invention, the control 32 includes a microprocessor unit. The microprocessor unit can easily be programmed to calculate relationships between temperatures and percentages of control of both the cooling provided by the refrigeration unit 26 and the heating provided by the combustion burner 27. The percentage or amount of heating and cooling can be calculated by the dryer control 32 with the on-time information it has stored concerning the heater 27 and cooler 26. In addition, the microprocessor unit easily provides for a clock signal which will properly sequence the flow and provide means for calculating time periods for the time delays desired in the flowchart.

In the preferred embodiment represented in the flowchart of FIG. 4, the initial mode decision between mode 2 and mode 3 is made in block 40 where the temperature setpoint $T_S$ is compared to a predetermined value, in this case 140° F. If the temperature setpoint is greater than 140° F., then the decision blocks 41 through 45 are sequentially implemented to determine if the mode 3 control should be used. Implementing mode 3 in block 46, the burner is maintained on a high/low control and the cooling unit of the cooling/refrigeration unit 26 is off. The decision factors in implementing the high/low mode 3 operation include the percentage of heating a time delay and the temperature setpoint considerations shown. In block 44 if the measured or actual temperature $T_{ACT}$ is greater than the temperature setpoint plus 3° F., then the control will shift to the mode 2 decision making blocks. Block 45 shows decisions that can be made to determine if the unit is in a preheat condition.

If the decision in block 40 is that the temperature setpoint is less than 140° F. or other temperature value that has been programmed, then the control unit will analyze the operating conditions to determine if a mode 2 or a mode 1 condition initially exists. Blocks 47, 48 and 49 institute decisions which place the control in a mode 2 operation, providing for the burner on a "low fire" and control the cooling by use of the cooling unit 26. Both blocks 43 and 48 implement a one minute or other desired time delay into the response system. Block 49 is similar to block 44 in that it controls the shift of control from decisions which will lead possibly to a mode 2 or mode 3 operation. By comparing the actual temperature $T_{ACT}$ to the setpoint temperature, $T_S$, the dryer unit efficiently operates over a wide range and provides for effective control in anticipation of changes in the system. While the presently preferred embodiment shown in FIG. 2 uses a 3° F. difference between such temperatures, other temperature differences can also be used. Before going from a mode 2 to a mode 1 operation, the flow chart of FIG. 4 blocks 52 and 53 determine both a temperature differential, such as block 52 comparing the residual temperature, $T_R$, with the setpoint temperature, $T_S$, or block 53 in which the additional factor of the percentage of cooling is evaluated. Separate time delays are provided by blocks 51 and 54 for either of these two conditions before shifting the control into a mode 1 operation. Mode 1 operation is controlled by decisions blocks 56, 57 and 58 to institute a burner control being off and the temperature control being executed primarily by control of the cooling from the cooling means 26. The system initiates a value to the first variable A which corresponds to a desired temperature differential used in block 52. If the control has shifted from mode 2 to mode 1 operation through decision block 52, then the value of A has been significant in causing such a shift. Block 59 is provided to incrementally increase the value of A each time that the operation shifts from mode 1 to mode 2 operation within a predetermined time interval. This provides in essence a "learning" system in which the unit changes the criteria in which it will shift from mode 2 to mode 1 operation. By increasing the value of A in block in 59, the shift from mode 2 to mode 1 through block 52 will not occur under through block 52 will not occur under the same operating conditions. Initial valuations of A in preferred embodiments have been approximately 20° F. By using the appropriate time delays and the "learned" valuation of A, it is possible to minimize the transition from one mode to another so as to optimize the steady state operation of the dryer as a whole.

In the foregoing specification, we have set out certain preferred embodiments and practices of our invention. It will be understood that the invention may be practiced otherwise within the scope of the following claims.

We claim:

1. An apparatus for heating and dehumidifying plastic materials in a container with a current of warm dry air comprising:

means for maintaining a current of air flowing to and from such container;

desiccant means for removing moisture from said air current;

cooling means for cooling said air current downstream from said desiccant means;

heat exchanger means for heating said current downstream from said desiccant means;

sensing means for measuring the temperature of said air current downstream of said cooling and heat exchanger means; and control means to vary the cooling supplied by said cooling means and the heat supplied by said heat exchanger means in response to the measured temperature at said sensor means to control the temperature of said air current to the desired setpoint temperature.

2. The heating and dehumidifying apparatus of claim 1 wherein said heat exchanger means is a fuel combustion heater.

3. The heating and dehumidifying apparatus of claim 2 wherein the control means further comprises a control having three operational modes where the first mode provides control by varying the cooling of said cooling means, and the second mode provides control by varying the cooling by said cooling means and heating by said heater, and the third mode provides control by varying the heating by said heater.

4. The heating and dehumidifying apparatus of claim 3 wherein said control means operates in the second mode to provide a constant level of heating from said heater with control of the measured temperature by varying the cooling supplied by said cooling means.

5. The heating and dehumidifying apparatus of claim 3 wherein said control means operates in the third mode to provide two levels of heat from said heater, a low level of heat and a high level of heat with control of the measured temperature by varying the high level of heat supplied by said heater.

6. The heating and dehumidifying apparatus of claim 3 wherein said control means operates in the second mode to provide a constant level of heat from said heater while varying the cooling supplied by said cooling means; and operates in the third mode to provide two levels of heat from said heater, a low level of heat and a high level of heat with control of the measured temperature by varying the high level of heat supplied by said heater.

7. The heating and dehumidifying apparatus of claim 3 wherein said control means transistion from the third mode to the second mode is controlled by the heating required to be supplied by said heater.

8. The heating and dehumidifying apparatus of claim 7 wherein the transition from the third mode to the second mode is further controlled by the difference between the measured temperature of the air current and the setpoint temperature.

9. The heating and dehumidifying apparatus of claim 3 where said control means transition from the second mode to the third mode is controlled by the cooling required to be supplied by said cooling means.

10. The heating and dehumidifying apparatus of claim 9 wherein the transition from the second mode to the third mode is further controlled by the difference between the measured temperature and the setpoint temperature.

11. The heating and dehumidifying apparatus of claim 3 where said control means transition from the first mode to the second mode is controlled by the cooling required to be supplied by the cooling means.

12. The heating and dehumidifying apparatus of claim 11 wherein the transition from the first mode to the second mode is further controlled by the difference between the measured temperature and the setpoint temperature.

13. The heating and dehumidifying apparatus of claim 3 wherein said control means transition from the second mode to the first mode is controlled by the amount of cooling required by said cooling means.

14. The heating and dehumidifying apparatus of claim 13 wherein the transition from the second mode to the first mode is further controlled by the difference between the residual temperature and the setpoint temperature exceeding a first variable.

15. The heating and dehumidifying apparatus of claim 14 wherein said first variable is varied when the control transfers from the first mode to the second mode.

16. The heating and dehumidifying apparatus of claim 14 wherein said first variable is incrementally increased each time the control means transfers from the first mode to the second mode operation within a predetermined time period.

17. The heating and dehumidifying apparatus of claim 13 wherein the transistion from the first mode to the second mode is further controlled by the difference between the actual temperature and the setpoint temperature.

18. The heating and dehumidifying apparatus of claim 3 wherein said control means transition from modes is controlled by the difference between the measured temperature and the setpoint temperature.

19. The heating and dehumidifying apparatus of claim 18 wherein the transition from modes is further controlled by the heat supplied by the combustion heat exchanger.

20. The heating and dehumidifying apparatus of claim 19 wherein the transition from modes is further controlled by the cooling supplied by the cooling means.

21. The heating and dehumidifying apparatus of claim 3 wherein said control means transition from modes is controlled by the cooling supplied by said cooling means.

22. The heating and dehumidifying apparatus of claim 21 wherein the transition from modes is further controlled by the difference between the measured temperature and the setpoint temperature.

23. The heating and dehumidifying apparatus of claim 22 wherein the transition from modes is further controlled by the difference between the residual temperature and setpoint temperature exceeding a first variable.

24. The heating and dehumidifying apparatus of claim 23 wherein said first variable is increased each time the control means transfers from the first mode to the second mode.

25. The heating and dehumidifying apparatus of claim 20 wherein the transition from modes is further controlled by the difference between the residual temperature and setpoint temperature exceeding a first variable.

26. The heating and dehumidifying apparatus of claim 25 wherein said first variable is increased each time the control means transfers from the first mode to the second mode.

27. The heating and dehumidifying apparatus of claim 6 wherein said fuel combustion heater is a single burner heat exchanger having a low fire level of fuel and air mixture and having a high fire level of fuel and air mixture.

28. The heating and dehumidifying apparatus of claim 27 wherein said low fire mixture is maintained in the second mode and said high fire is varied during the third mode operation.

29. In the process of air drying and dehumidifying pellets of hygroscopic thermoplastics at a selected temperature in the range between about 130° F. and 400° F. by, generating a current of air;
measuring the temperature of said current of air;
passing said current of air through said pellets;
removing the moisture from said air;
the improvement comprising,
selecting one of three modes of drying, each mode being adapted to a separate portion of the operating range,
(a) the first of said modes comprising cooling said current of air by cooling downstream of said removing of said moisture and adjusting the level of said cooling without heating to maintain that temperature;
(b) the second of said modes comprising heating said current of air by a combustion heat exchanger and adjusting said cooling to prevent its temperature from rising above said selected temperature; and (c) the third of said modes comprising heating said current of air by a combustion heat exchanger and without cooling adjusting combustion in said heat exchanger.

30. The process of air drying and dehumidifying of claim 29 further including measuring the residual temperature and comparing the residual temperature to the setpoint temperature; and further where said selecting of one of said modes is controlled by the difference between said setpoint temperature and said residual temperature, by the difference between said setpoint temperature and said measured temperature, by the amount of cooling supplied downstream of said moisture removal, and by the amount of heating supplied in said second mode and third mode.

31. The process of air drying and dehumidifying of claim 30 where in the heating in said second mode is at a fixed level and said cooling is varied, and wherein the heating supplied in the third mode is varied above the level of heating supplied in the second mode.

* * * * *